April 21, 1953 L. P. GARNER 2,636,142

ELECTRON DISCHARGE DEVICE

Filed June 24, 1950 3 Sheets-Sheet 1

INVENTOR
LLOYD P. GARNER
BY William A. Zalesak
ATTORNEY

April 21, 1953 L. P. GARNER 2,636,142

ELECTRON DISCHARGE DEVICE

Filed June 24, 1950 3 Sheets-Sheet 2

INVENTOR
LLOYD P. GARNER
BY William A. Zalesak
ATTORNEY

April 21, 1953 L. P. GARNER 2,636,142

ELECTRON DISCHARGE DEVICE

Filed June 24, 1950 3 Sheets-Sheet 3

INVENTOR
LLOYD P. GARNER
BY William A. Zalesak
ATTORNEY

Patented Apr. 21, 1953

2,636,142

UNITED STATES PATENT OFFICE 2,636,142

ELECTRON DISCHARGE DEVICE

Lloyd P. Garner, Lancaster, Pa., assignor to Radio Corporation of America, a corporation of Delaware Application June 24, 1950, Serial No. 170,231

25 Claims. (Cl. 313—20)

My invention relates to electron discharge devices, more particularly though not necessarily exclusively to such devices useful at the lower as well as higher radio frequencies and capable of delivering extremely large amounts of power.

The provision of a tube which will operate at radio frequencies and deliver large amounts of useful power presents serious problems incapable of solution with conventional designs. At the higher power levels as at the higher frequencies inductances and capacitances become appreciable and require external neutralization. Thus, the conventional triode when utilized as an amplifier requires the introduction of neutralization in the external circuit. This is the case because tubes inherently have built-in common circuits and unless the lead inductances and interelectrode capacitances are neutralized spurious oscillations result.

The usual triode tube is essentially a grid separation device having grid to cathode, grid to anode and anode to cathode interelectrode capacitances. Of the three, the grid to cathode capacitance is highest. The grid to anode capacitance is high. The anode to cathode capacitance is lowest. As the power level or frequency of operation is raised, the least desired capacitance that between the grid and cathode becomes excessively large and troublesome.

In a grounded grid circuit, the conventional triode does not require external neutralization. However, the power gain is proportional to the voltage swings of the anode and cathode with respect to the grid. Low power gain results unless utilization is made of extremely close spacings or very low alternating current swings in the input circuit. The extremely close spacings between the cathode and grid electrodes requred for higher power gain in grounded grid operation are difficult to attain in conventional tubes and at the higher power levels the difficulties of maintaining such spacings during operation are all but insurmountable. When low input circuit voltage swings are used, the active electrode areas must become excessively large in order to attain the desired perveance.

When neutralization is resorted to, as in the past, it has attendant serious shortcomings. Such neutralization, for example, constitutes merely spot neutralization which is good only for a particular frequency or band of frequencies. Furthermore, there is always the possibility of operation at undesirable modes.

A further problem in the conventional triode is grid dissipation. A serious limitation on the power output of such devices is the grid operating temperature. In the conventional electron discharge device, the grid absorbs considerable heat energy as a result of electron bombardment and electron collection during the positive portion of the grid radio frequency operating cycle. The usually high grid operating temperature often permits undesirable electron emission to take place from the grid. Also, the high grid temperature often causes serious deformation of the grid structure with consequent electrical instability.

Optimum input and output circuit shielding, interelectrode paths for circulating currents, surge impedance and tube drop cannot be attained with conventional tube constructions particularly at the higher power levels.

It is, therefore, a principal object of my invention to provide an improved electron discharge device particularly useful as an amplifier and delivering large amounts of power at radio frequencies.

Another object is the provision of an electron discharge device having exceptionally low surge impedance, extremely low inductance paths and extremely high capacity paths.

Another object is the provision of an electron discharge device in which the input and output circuits are completely shielded one from the other both electrically and mechanically.

Yet another object is the provision of an electron discharge device in which electron collection by the grid and the resultant heating thereof is substantially reduced.

Another object of my invention is to provide such a device particularly suitable as a high power, high gain amplifier, having substantially complete electrical stability and freedom from spurious oscillations.

A further object of my invention is to provide such a device having a small average grid current.

Another object is the provision of such a device in which the internal interelectrode anode to cathode capacitance is high and the grid is substantially completely mechanically and electrically shielded from the anode.

A still further object is the provision of such a device in which grid cooling by radiation is substantially improved.

Yet another object is the provision of an electron discharge device which essentially embodies internal cathode separation as distinguished from the grid separation of the conventional device.

Briefly, an electron discharge device made in accordance with my invention includes cathode, control grid and anode electrodes arranged in spaced array. A member which may function as a beam former is conductively connected to the cathode. Said member is provided with portions or elements which extend substantially between the grid electrode and the anode. Furthermore, the extending portions or elements are directly conductively connected to said member along substantially the entire active electron region.

The novel features which I believe to be characteristic of my invention are set forth in the appended claims. The invention will best be understood by reference to the following description taken in connection with the accompanying drawings, in which:

For the purpose of illustration, my invention will be described in connection with a triode type super power electron discharge device. However, it should be understood that it is not limited to the particular device shown. As will be apparent, certain features of the illustrative device and the modifications thereof are described and claimed in my co-pending joint application with W. N. Parker and W. E. Harbaugh, Serial No. 81,932, filed March 17, 1949, now U. S. Patent No. 2,544,664, dated March 13, 1951, and which is assigned to the same assignee as my present application. Constructional features which are common to both will not be described in detail here in the interest of brevity and clarity except where necessary for a complete understanding of my present invention.

Figure 1:
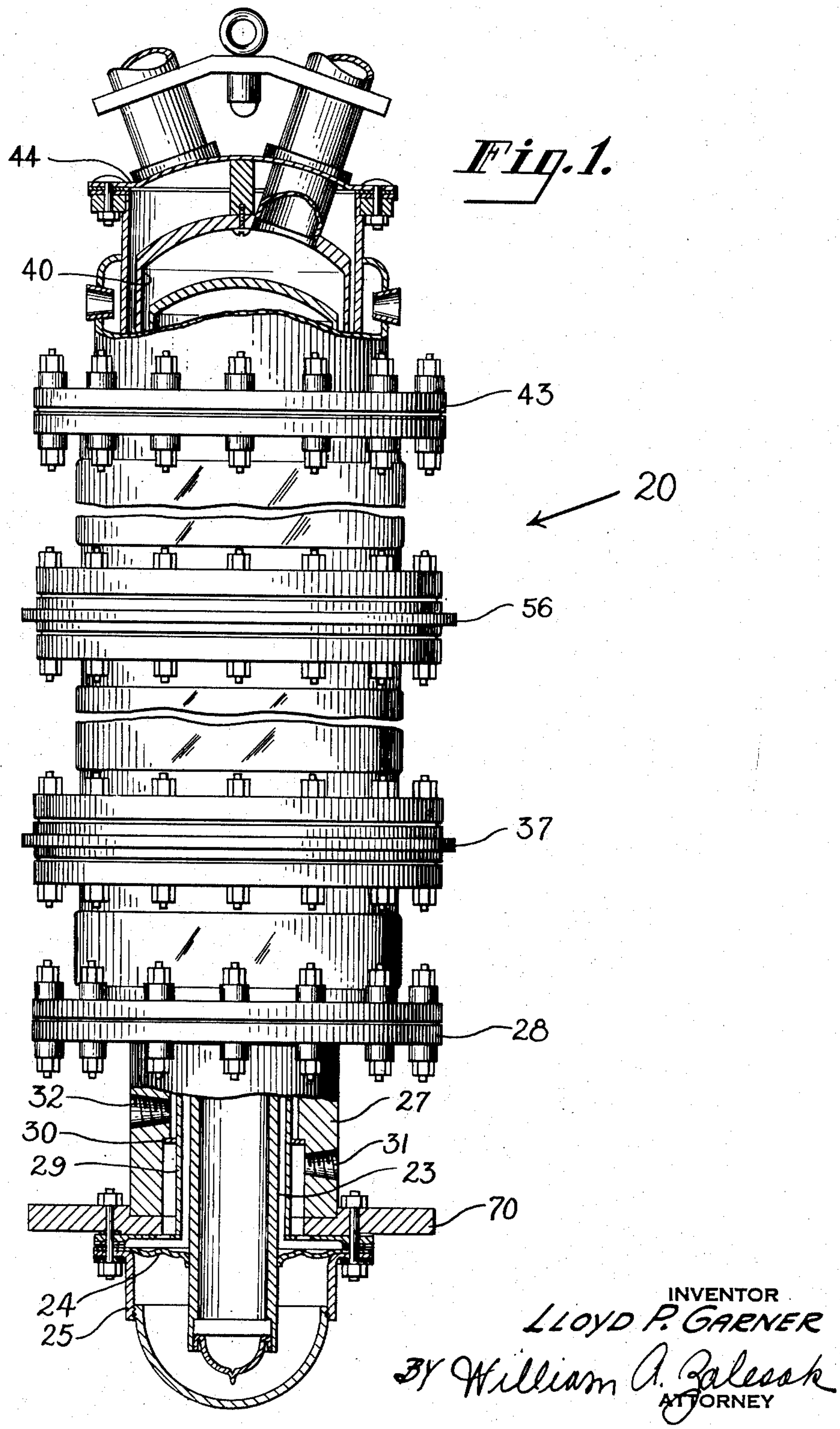
Figure 1 is an elevational view partially in section and broken away for convenience of an electron discharge device constructed in accordance with my invention.
Figure 2:
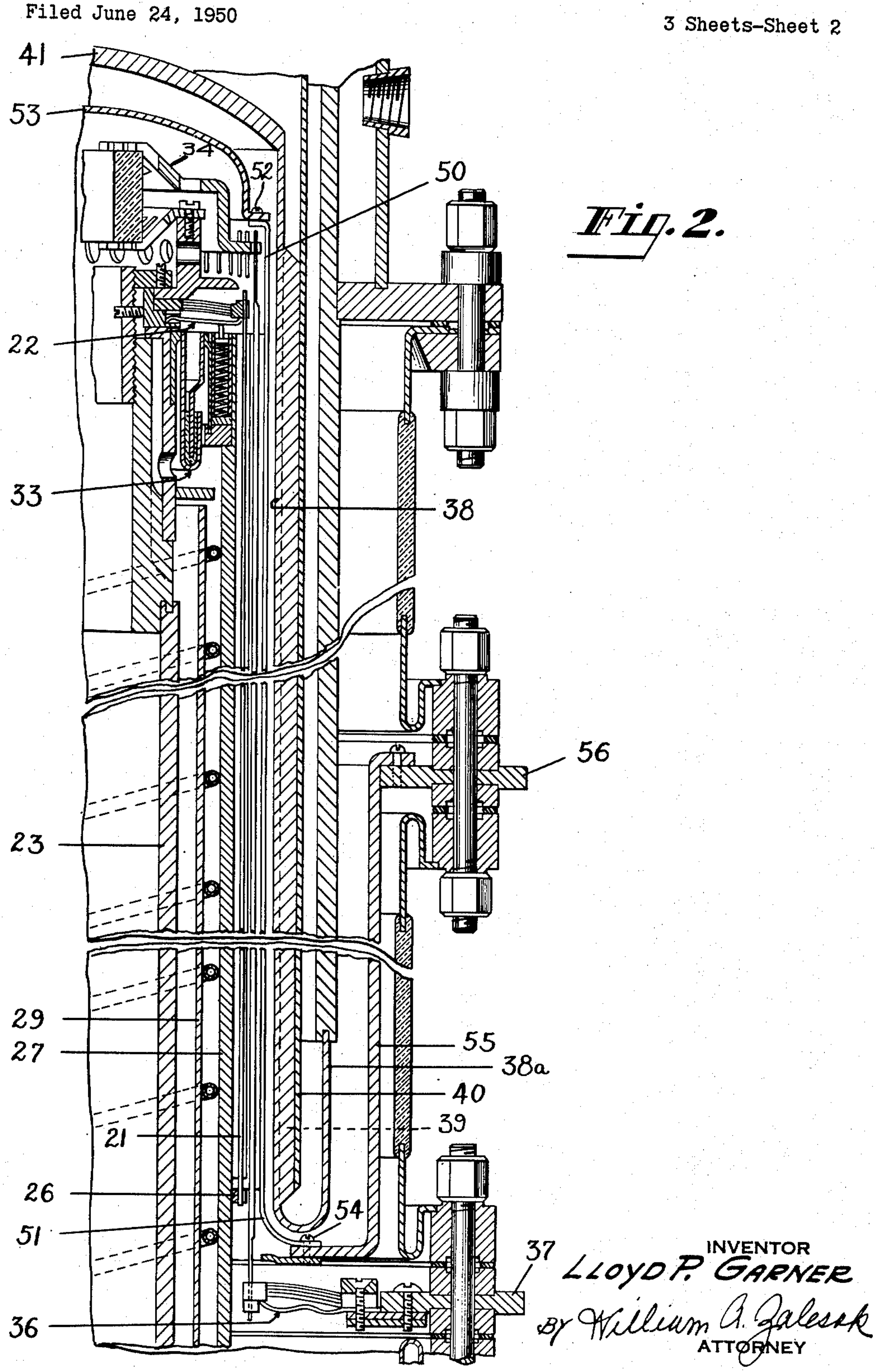
Figure 2 is a longitudinal sectional view thereof partially broken away for convenience.

Referring now to the drawings and to Figures 1 and 2 in particular, electron discharge device 20 is an internally water-cooled super power beam triode having a demountable evacuated envelope as shown.

The elongated cathode elements 21 constitute a copious source of electrons. Each cathode element 21, as in said co-pending application, is supported adjacent its upper end by a flexible support means indicated generally at 22 which, in turn, is supported from central supporting conductor 23. Supporting conductor 23 is connected at its lower end to a copper diaphragm 24 by means of which it is connected conductively to terminal ring 25.

The lower or other end of each cathode element 21 is mounted in ring 26 brazed to supporting conductor 27 just below the lower end of a beam former array. Supporting conductor 27 is coaxial and concentric with supporting conductor 23 and has a lower portion of increased diameter. Supporting conductor 27 is connected to terminal ring 28 and below the ring forms part of the exterior of the tube.

A partition 29 extends between supporting conductors 23 and 27 and is connected to supporting conductor 27 at 30. Partition 29 forms two cooling channels for a fluid coolant such as water. Inlet 31 and outlet 32 formed in the lower external portion of supporting conductor 27 communicate with the channels.

It should be noted that supporting conductors 23 and 27 are rigidly connected by a mechanically strong and hermetic seal adjacent their upper or inner ends as indicated generally at 33.

Insulated from and supported on central conductor 23 is a hat-shaped support member 34 having a peripheral flange at its lower extremity with slots and centering or locating V-notches formed therein. There is one slot for each elongated control electrode or grid element 35 of which there are two for each cathode element 21 as will be apparent. Grid elements 35 each hook into support member 34 and are accurately positioned by means of the slots and V-notches. Adjacent their lower ends each grid element 35 is hooked into a separate flexible support means 36 which, in turn, are supported from a grid terminal ring 37. Flexible support means 22 and 36 are laminated as described in detail and claimed in the co-pending application of W. E. Harbaugh, Serial Number 95,442, filed May 26, 1949. Support 22 is highly flexible while supports 36 are each both flexible and resilient.

As is apparent from Figures 1 and 2, electron collector or anode electrode 38 is reentrant and coaxial with the cathode and grid electrodes. Anode 38 has a plurality of coolant channels 39 formed therein closed along one side thereof by a loosely fitting sleeve-like partition 40. The inner or upper end of anode 38 is closed by wall 41 while the other end of the anode has a portion 38*a* turned back upon itself and joined to supporting conductor and lead-in 42. Supporting conductor 42 is connected to anode terminal ring 43. At its upper end conductor 42 is connected to header 44 which is, in turn, connected to and supports partition 40.

As thus far described, electron discharge device 20 is seen to be substantially identical with the electron discharge device of said co-pending application.

Figure 3:
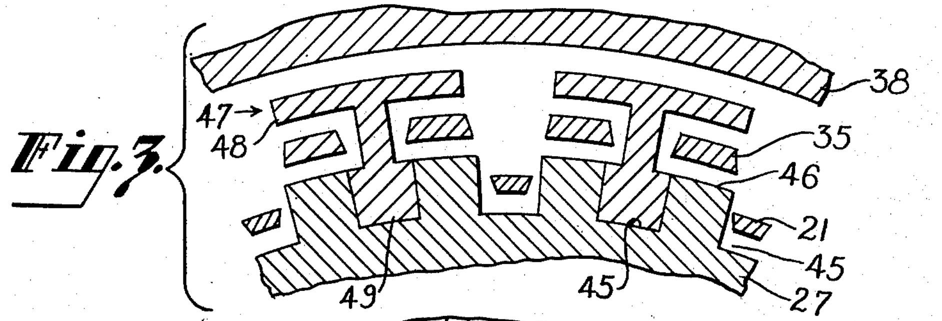
Figure 3 is a transverse fragmentary sectional view of a portion of the active electron region of said device.

Referring now to Figure 3, supporting conductor and lead-in 27 has a plurality of axially extending slots or grooves 45 formed in the surface thereof away from supporting conductor 23. Cathode elements 21 are preferably substantially trapezoidal in cross section and extend in alternate slots 45; the close spacings being maintained accurately by flexible, non-deforming support 21. The control electrode or grid elements 35 are also trapezoidal in cross section. There are twice as many grid elements 35 as cathode elements 21 and each is mounted opposite one of the lands 46 between slots 45. As shown the broad face of each grid element faces a land and each is just enough smaller than the lands so as not to extend beyond the same in the circumferential direction. Here, too, the close spacings are accurately maintained by the non-deforming grid support means.

In each of the remaining alternate slots 45, I mount an elongated rail or T-shaped element 47 having a cross arm or head 48 and a projection or support 49. Elements 47 extend through the entire active electron region of device 20 and between the grid elements and the anode. Projections or supports 49 for elements 47 extend axially along substantially the entire active electron region and are directly conductively and mechanically connected to supporting conductor 27. Silver solder serves to hold supports 49 in place in slots 45. Supports 49 extend downward to cathode support ring 26 (Figure 2) and upward to the top of or somewhat beyond the beam former or supporting conductor 27. Heads or cross arms 48 extend axially both above and below supports 49 and form upper and lower extensons 50, 51 respectively. Extension 50 is connected by bolts 52 to a cup-shaped shield 53 which encloses the end of the grid structure and electrically isolates the same from anode end wall 41. Extensions 51 are turned outward and connected by bolts 54 to annular conductor 55. Annular conductor 55, in turn, is connected to cathode radio frequency terminal ring 56 and serves to shield the lower ends of grid elements 35 as well as grid support 36 and terminal 37 from the anode.

Slotted supporting conductor 27 functions as the beam former of said copending application in that the corners of lands 46 adjacent cathode elements 21 have a focusing effect on the sheet-like electron streams flowing to the anode. In addition, T-shaped elements 47 also serve as means for affecting the electron streams and have an additional focusing effect on the electrons. As a result electron collection by the grid elements is minimized even when they are more positive than the anode. Grid elements 35 also radiate heat more effectively and hence are capable of greater dissipation. This is so because elements 47 are in good heat exchange relation with cooled supporting conductor 27 and run substantially cooler than anode 38.

Also of great importance is the substantially reduced grid to anode capacitance and greatly increased anode to cathode capacitance. In tubes constructed in accordance with my invention, the grid to anode capacitance becomes the lowest interelectrode capacitance. Thus the difficulties encountered with conventional devices in attempting to neutralize the grid to anode capacitance are eliminated. Furthermore, interelectrode lead inductances are also minimized in accordance with my invention and extremely low impedance interelectrode electrical paths are provided.

The reduction in coupling between the input and output circuits within the electron discharge device in accordance with my invention is also of great significance and minimizes the possibility of spurious oscillations. As has been seen, the grid elements and supporting structure is completely shielded from the anode. In addition, output circuit circulating currents flow radially from the anode to heads or cross arms 48. Then, still radially, along projections or supports 49 directly to supporting conductor 27 which is conductively connected to each of the cathode elements. As in conventional devices, the input circuit circulating currents flow axially along the grid elements. The 90 degree difference effectively reduces coupling between the currents flowing along the T-shaped elements and the grid elements.

The effectiveness of my invention in improving the performance of electron discharge devices is apparent from the following data. At the 1500 volts diode point, that is, with 1500 volts on both the anode and grid elements for each linear inch of active electrode area the plate current is 0.725 ampere while the grid current is only 0.0135 ampere. With 1500 volts on the anode and 3000 volts positive on the grid, the anode current is approximately 1.36 amperes per linear inch while the grid current is only 0.053 ampere per linear inch. The mu of such a tube is approximately 53. The spacings and dimensions from which the foregoing data was obtained is substantially as follows. The slots 45 are 0.100 inch wide while lands 46 are 0.125 inch wide. The broad face of cathode elements 21 is 0.057 inch in width and is set back into slots 45, 0.030 inch. Grid elements have a broad surface facing lands 46 which is 0.120 inch and are spaced 0.030 inch from lands 46. The grid elements are 0.060 inch thick in the cathode to anode direction. The grid elements at their point of closest approach to supports 49 are each spaced 0.030 inch therefrom. The grid elements are also spaced 0.030 inch from the inner surface of heads or cross arms 48. Heads 48 are each 0.120 inch from the surface of lands 46 and are 0.030 inch in thickness. The heads or cross arms are each spaced 0.175 inch from anode 38 and have overhanging portions between the grid elements and the anode which are 0.115 inch in length. Said overhanging portions do not extend all the way to a point which lies along the side walls of slots 45 extended radially toward the anode but stop 0.040 inch short thereof. It is to be understood that the foregoing dimensions are purely by way of illustration and in order that the test data given above may be fully appreciated.

Figure 4:
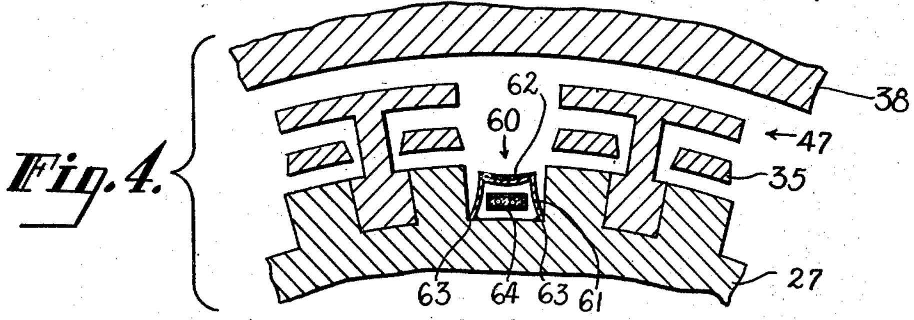
Figure 4 is a similar view of a modification in which indirectly heated oxide coated cathodes are utilized.

In accordance with the form of my invention shown in Figure 4 even greater isolation between the input and output circuits within the electron discharge device may be obtained. Here the arrangement of the anode 38, grid elements 35, rail or T-shaped elements 47 and supporting conductor and lead-in 27 are the same as described above. An indirectly heated cathode 60 is provided comprising a base or support member 61 which may be made of any suitable material such as the usual nickel alloy. Support members 61 each have a concave face presented toward anode 38 which is coated with suitable electron emission material 62 such as mixtures of barium, strontium and calcium oxides. The wing portions of base or support member 61 are joined to supporting conductor 27 by silver solder or the like at points 63. An elongated heater 64 is mounted within support member 61 in close proximity to emission material 62. The heater wires are encased in suitable insulating material such as aluminum oxide and have one end thereof connected to supporting conductor 23 and the other end connected to supporting conductor 27. These connections are conveniently made at the upper ends of the supporting conductors since flexible mounting 22 (Figure 2) is omitted in this construction.

In this form of construction the circulating currents of the output circuit after flowing radially inward along T-shaped elements 47 to supporting conductor 27 now may flow directly to each of the active cathode surfaces without flowing in an axial direction; on the other hand, the circulating currents of the input circuit continue to flow axially as heretofore. As a consequence, coupling between the circulating input and output currents is completely minimized.

The construction shown in Figure 4 also has the advantage of making available the increased emission possible from the alkaline earth oxides as compared to the carburized thoriated tungsten elements 21. In conventional devices the cathodes are capable of supplying sufficient emission and all or more than can be effectively handled. I have found that the construction and electron optics in accordance with my present invention are of such an optimum nature that the performance thereof is limited by the capability of known electron emission materials to supply electrons in sufficient quantity.

Figure 5:
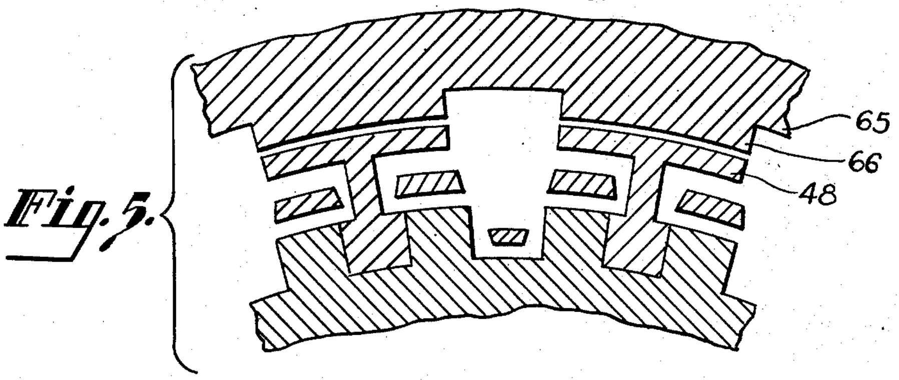
Figures 5 and 6 are similar views of further modifications of anode electrodes which may be employed with my invention.
Figure 6:
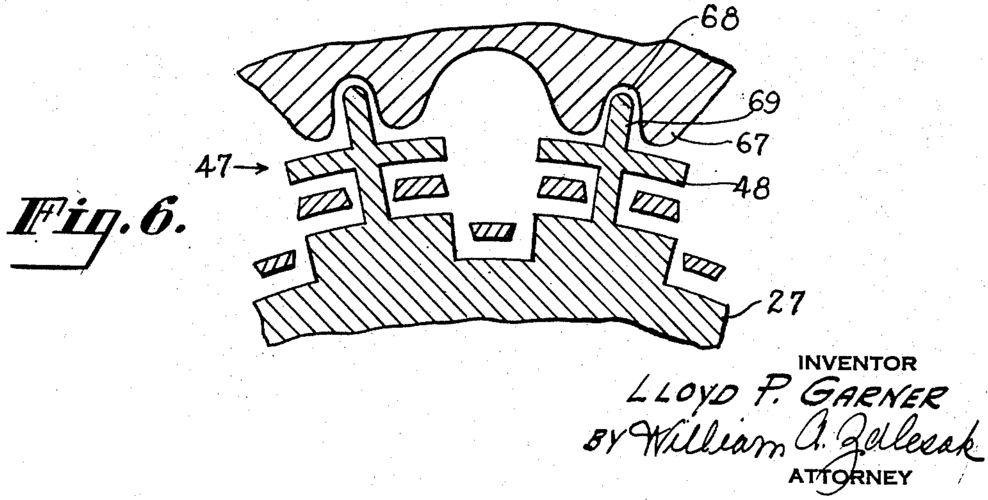

In Figures 5 and 6 various forms are illustrated for further increasing the anode to cathode interelectrode capacitance. In Figure 5 anode 65 is provided with projections 66 which more closely approach cross arms or heads 48. In Figure 6 projections 67 form curved surfaces which closely approach head 48. Projections 67 are each provided with a recess 68 into which an extension 69 extends. In Figure 6 a further modification is shown in that T-shaped elements 47 are integrally formed with supporting conductor 27. This provides somewhat improved radio frequency paths but on the other hand it is somewhat more difficult to fabricate even though the copper of which these parts are preferably made readily lends itself to forming.

Referring once again to Figure 1, it is seen that supporting conductor 27 is connected to a terminal ring 70 at its lower end which together with terminal ring 25 serve as the heating current terminals of device 20. It is also seen that the grid terminal ring 37 is located between two cathode radio frequency terminals 28 and 56 while anode terminal ring 43 is located on the other side of terminal ring 56. This arrangement of terminals greatly simplifies the external circuits for electron discharge device 20. Such a device can readily be connected in a tank circuit in which the grid circuit is completely isolated and shielded from the anode circuit. The shortened electrical paths both inside and outside the tube minimizes the inductance thereof which would otherwise be appreciable at either the higher frequencies or higher power levels. Such a device as distinguished from conventional devices is one which embodies internal cathode separation rather than grid separation and makes possible the effective use of cathode separation externally of the tube.

From the foregoing, it is apparent that electron discharge devices constructed in accordance with my invention are capable of operation at greater efficiency as well as handling considerably higher power with greater gain than devices heretofore used. Furthermore, my invention is subject to variation and modification without departing from the scope thereof. Therefore, it is intended to cover all such modifications and variations as come within the scope of the appended claims.

Reference is made to copending application Serial No. 170,097 disclosing subject matter which appears in this application.

I claim:

1. An electron discharge device, comprising a source of electrons and means for supporting the same with a low impedance electrical coupling therebetween, an output electrode spaced from said source of electrons, and electrode means intermediate said source of electrons and said output electrode for affecting the flow of electrons and conductively connected along substantially the entire active portion thereof to said first mentioned means and having a low impedance electrical coupling with said output electrode along substantially the entire active portion thereof.

2. An electron discharge device, comprising a source of electrons, an output electrode spaced from said source of electrons, and means intermediate said source of electrons and said output electrode for affecting the flow of electrons, said means being conductively connected to said source of electrons along substantially the entire active portion thereof.

3. An electron discharge device, comprising a source of electrons, a collector for receiving electrons spaced from said source of electrons, and an electrode extending intermediate said source of electrons and said collector for affecting the flow of electrons, said electrode and said source of electrons being directly conductively connected along substantially the entire active length thereof, said electrode further having a surface disposed in closely spaced face to face relation with said collector.

4. An electron discharge device, comprising a source of electrons and means for supporting the same conductively connected thereto, an anode spaced from said source of electrons, and electrode means intermediate said source of electrons and said anode and having a low impedance electrical coupling with said anode along the entire active portion thereof and directly conductively connected along substantially the entire active length thereof to said first mentioned means.

5. An electron discharge device, comprising a source of electrons and means for supporting the same conductively connected thereto, a collector for receiving electrons spaced from said source of electrons, means for supporting said collector, a control electrode extending in the region between said source and said collector and means for supporting the same, and means extending intermediate said control electrode and said collector and conductively connected along substantially the entire active length thereof to said first mentioned means.

6. An electron discharge device, comprising a cathode electrode and a support therefor, an anode electrode spaced from said cathode, a control electrode intermediate said cathode and anode electrodes, said electrodes forming an active electron region in said device, and means intermediate said control electrode and said anode electrode and substantially shielding the former from the latter, said means being conductively connected directly to said cathode support along substantially the entire active electron region.

7. An electron discharge device, comprising conductive support means having a plurality of slots formed therein, a plurality of cathode elements one extending in alternate slots of said support means and conductively connected thereto, and means for affecting the flow of electrons from said cathode elements and extending in the remaining slots and electrically conductively connected thereto along substantially the entire length thereof.

8. An electron discharge device, comprising a plurality of cathode elements, a supporting conductor having a plurality of slots formed in the surface thereof with lands therebetween, each of said cathode elements extending in alternate slots and conductively connected to said supporting conductor, a plurality of control elements extending in spaced relation to said supporting conductor one being disposed opposite each of said lands, means for supporting said control elements, an anode spaced from said control elements, and a plurality of substantially T-shaped elements each having a support extending in the remaining alternate slots and conductively connected thereto along substantially the entire length thereof, each of said T-shaped elements having a cross arm extending between the adjacent control elements and said anode.

9. An electron discharge device, comprising a plurality of cathode elements, a supporting conductor having a plurality of slots formed in the surface thereof with lands therebetween, each of said cathode elements extending in alternate slots and conductively connected to said supporting conductor, a plurality of control elements extending in spaced relation to said supporting conductor, one being disposed opposite each of said lands, means for supporting said control elements, an anode spaced from said control elements, and a plurality of substantially T-shaped elements each having a support extending in the remaining alternate slots and conductively connected thereto along substantially the entire length thereof, each of said T-shaped elements having a cross arm extending between the adjacent control elements and said anode, said T-shaped elements being in good heat exchange relationship with said supporting conductor, and means for cooling said supporting conductor.

10. An electron discharge device, comprising an elongated supporting conductor having a plurality of slots formed therein with lands therebetween, a plurality of elongated spaced cathode elements each extending in an alternate one of said slots, a plurality of elongated grid elements each opposed to and spaced from one of said lands, a plurality of elongated elements having head and projection portions, each of said projection portions extending in one of the remaining slots and conductively connected thereto along substantially the entire length thereof, an anode spaced from said cathode and control elements, said anode and said slotted portion of said supporting conductor defining an active electron region, said head portions extending axially beyond said active electron region and forming extensions, and shield means connected to said extensions.

11. An electron discharge device, comprising a pair of spaced supporting conductors one of which has a plurality of slots formed in a surface thereof with lands therebetween, a plurality of elongated spaced cathode elements each extending in an alternate one of said slots and conductively connected to said supporting conductors, an anode, means for supporting said anode in spaced relation to said cathode elements, a plurality of elongated grid elements spaced from and opposed to said lands, a plurality of elongated elements each having head and projection portions, said projection portions each extending in one of the remaining slots and conductively connected to said one supporting conductor, each of said head portions extending between said anode and the grid elements adjacent thereto, said head portions further extending axially beyond said grid elements and forming extensions, a shield enclosing one end of said grid elements and connected to the extensions formed at one end of said elongated elements, and lead-in means connected to said elongated elements adjacent the other end thereof.

12. An electron discharge device, comprising a gas tight envelope, a pair of supporting conductors in spaced relation and extending through said envelope, one of said supporting conductors having a plurality of slots formed therein with lands therebetween, a plurality of elongated spaced cathode elements each extending in an alternate one of said slots and conductively connected to said supporting conductors, a plurality of elongated grid elements each opposed to and spaced from one of said lands, an anode in spaced relation to said cathode and grid elements, a cathode terminal for said cathode elements connected to said one supporting conductor and extending outside of said envelope, an anode terminal connected to said anode and sealed through said envelope, a grid terminal connected to said grid elements sealed through said envelope and intermediate said cathode and anode terminals, a plurality of elongated elements each having head and projection portions, said projection portions extending in the remaining alternate slots and conductively connected thereto along substantially the entire length thereof, said head portions extending in the space between said grid elements and said anode and a terminal connected to said elongated elements and providing a second cathode terminal, and said second cathode terminal being sealed through said envelope intermediate said grid and anode terminals.

13. An electron discharge device having a gas tight envelope, comprising a pair of coaxial, concentric, tubular supporting conductors each of which forms a portion of said gas tight envelope, one of said supporting conductors having slots formed in a surface thereof within said gas tight envelope, means joining said supporting conductors in insulated gas tight relation adjacent one end thereof, means for cooling the opposed surfaces of said supporting conductors, a plurality of elongated spaced cathode elements each extending in an alternate one of said slots and conductively connected to at least said one supporting conductor, a plurality of grid elements each being opposed to one of said lands and spaced therefrom, a reentrant anode having a turned back portion and coaxial with said supporting conductors, means for supporting and cooling said anode, said anode forming a portion of said gas tight envelope, a plurality of elongated T-shaped elements having cross arm and support portions, said support portions extending in the remaining alternate slots of said one supporting conductor and electrically conductively connected thereto along substantially the entire length thereof, said cross arm portions extending axially beyond said support portions and forming extensions, a cup-shaped shield supported on the extensions at one end of said cross arm portions and enclosing one end of said grid elements, an annular conductor connected to the extensions at the other end of said cross arm portions and extending adjacent said turn back portion of said anode, and a terminal connected to said annular conductor and sealed through said gas tight envelope.

14. An electron discharge device, comprising a supporting conductor having a plurality of slots formed therein with lands therebetween, a plurality of cathode elements one extending in alternate slots of said supporting conductor and conductively connected thereto, an anode spaced from said cathode elements, a plurality of grid elements each extending opposite one of said lands and spaced therefrom, said cathode elements, grid elements and anode defining an active electron region and means for affecting the flow of electrons from said cathode elements and having a portion thereof extending between each of said grid elements and said anode and conductively connected to said supporting conductor along paths which are substantially co-extensive axially with said active electron region.

15. An electron discharge device comprising a supporting conductor having a plurality of slots formed therein with lands therebetween, a plurality of spaced cathode elements each extending in one of said slots, a substantially T-shaped projection on each of said lands and extending outwardly therefrom and a plurality of grid elements, each opposed to said lands and one on each side of said projections.

16. An electron discharge device, comprising a cathode assembly having a plurality of spaced electron emission surfaces, an anode spaced from said cathode assembly, a plurality of electrode elements in the space between said cathode assembly and said anode, and means on said cathode assembly conductively connected thereto and having a portion thereof extending in the region between two of said electrode elements to a point where a surface of said portion is disposed in face to face relation with said anode.

17. An electron discharge device, comprising a supporting conductor, a plurality of spaced electron emission elements, support means connecting each of said electron emission elements to said supporting conductor, means for heating each of said electron emission elements disposed between said support means and said supporting conductor, and anode spaced from said electron emission elements, a plurality of spaced control electrode elements in the space between said electron emission elements and said anode, and T-shaped elements on said supporting conductor and each having a portion extending between said control electrode elements and said anode.

18. An electron discharge device, comprising a cathode assembly having a plurality of spaced electron emission surfaces, an anode spaced from said cathode assembly and having spaced electron collection surfaces with projections formed therebetween and elements on said cathode assembly individually extending between different pairs of said emissive surfaces toward respective ones of said projections.

19. An electron discharge device, comprising a cathode assembly having a plurality of spaced apart electron emission elements, an anode spaced from said electron emission elements and having a plurality of electron collecting surfaces one opposite each of said electron emission elements, said anode having projections formed between each of said electron collecting surfaces and extending toward said cathode assembly and a plurality of projections on said cathode assembly one extending between each of said electron emission elements toward said projections on said anode, said projections having surfaces in closely spaced face to face relation.

20. An electron discharge device, comprising a cathode assembly having a plurality of spaced apart electron emission elements, an anode spaced from said electron emission elements and having a plurality of electron collecting surfaces one opposite each of said electron emission elements, said anode having projections formed between each of said electron collecting surfaces and extending toward said cathode assembly, a plurality of T-shaped elements on said cathode assembly having head and projection portions, said projection portions extending between said electron emission surfaces and toward said anode, said head portions extending in closely spaced face to face relation with said anode projections, and electrode elements in the spaces formed between said head portions and said cathode assembly.

21. An electron discharge device, comprising a source of electrons, a collector for receiving electrons spaced from said source of electrons and an electrode extending intermediate said source of electrons and said collector for affecting the flow of electrons, said electrode and said source of electrons being directly conductively connected along substantially the entire active length thereof, and said electrode further having a high capacitive coupling with said collector along substantially the entire active length thereof.

22. An electron device comprising a source of electrons, an output electrode spaced from said source of electrons, a first electrode means having a portion thereof intermediate said source and said output electrode and having a low impedance electrical coupling with said source along the entire active portion thereof, and a second electrode means intermediate said first electrode means and said output electrode having a low impedance electrical coupling with said out-put electrode and conductively connected along the entire active portion thereof to said first electrode means.

23. An electron device, comprising an electrode having an active portion forming a source of electrons, means for supporting said electrode with a low impedance electrical coupling therebetween, an anode spaced from said first mentioned electrode, a second electrode for affecting the flow of electrons intermediate said first mentioned electrode and said anode, means intermediate said second electrode and said anode and substantially shielding said second electrode, said last mentioned means being conductively connected to said first mentioned means along a portion thereof substantially coextensive with the entire active portion of said first mentioned electrode.

24. An electron device as described in claim 23 wherein said first mentioned means is conductively connected to said first mentioned electrode along substantially the entire active portion thereof.

25. An electron device as described in claim 23 wherein the inter-electrode capacitance between said first mentioned electrode and said anode through said last mentioned means is largest while the inter-electrode capacitance between said second electrode and said anode is least.

LLOYD P. GARNER.

References Cited in the file of this patent

UNITED STATES PATENTS

| Number | Name | Date |
| --- | --- | --- |
| 1,944,190 | Mouromtseff | Jan. 23, 1934 |
| 2,201,330 | Bruce | May 21, 1940 |
| 2,451,987 | Sloan | Oct. 19, 1948 |
| 2,512,859 | Smith | June 27, 1950 |
| 2,546,184 | Garner | Mar. 27, 1951 |